US012604281B2

(12) United States Patent
Arvola et al.

(10) Patent No.: US 12,604,281 B2
(45) Date of Patent: Apr. 14, 2026

(54) APPARATUS, METHOD AND COMPUTER PROGRAM FOR PRECODING

(71) Applicant: Nokia Technologies Oy, Espoo (FI)

(72) Inventors: Antti Arvola, Oulu (FI); Bikshapathi Gouda, Oulu (FI); Italo Atzeni, Oulu (FI); Antti Tölli, Oulu (FI); Juha Pekka Karjalainen, Oulu (FI); Sami-Jukka Hakola, Oulu (FI); Timo Koskela, Oulu (FI); Youngsoo Yuk, Seoul (KR)

(73) Assignee: Nokia Technologies Oy, Espoo (FI)

( * ) Notice: Subject to any disclaimer, the term of this patent is extended or adjusted under 35 U.S.C. 154(b) by 341 days.

(21) Appl. No.: 18/468,109

(22) Filed: Sep. 15, 2023

(65) Prior Publication Data

US 2024/0121730 A1    Apr. 11, 2024

(30) Foreign Application Priority Data

Sep. 30, 2022    (GB) .................................. 2214424.0

(51) Int. Cl.
*H04W 52/42*        (2009.01)
*H04B 7/06*         (2006.01)
*H04W 52/32*        (2009.01)

(52) U.S. Cl.
CPC .......... *H04W 52/42* (2013.01); *H04B 7/0617* (2013.01); *H04W 52/325* (2013.01)

(58) Field of Classification Search
CPC . H04W 52/42; H04W 52/325; H04W 52/367; H04W 52/262; H04W 52/146;

(Continued)

(56) References Cited

U.S. PATENT DOCUMENTS

| 11,277,175 | B2 | 3/2022 | Maamari et al. |
| 2012/0183093 | A1* | 7/2012 | Zhu ...................... H04B 7/0639 |
| | | | 375/285 |

(Continued)

FOREIGN PATENT DOCUMENTS

| EP | 2477341 A1 | 7/2012 |
| EP | 4013139 A1 | 6/2022 |

(Continued)

OTHER PUBLICATIONS

Tolli et al., "Distributed coordinated transmission with forward-backward training for 5G radio access", IEEE Communications Magazine, vol. 57, No. 1, Jan. 2019, pp. 58-64.

(Continued)

*Primary Examiner* — Fayyaz Alam

(74) *Attorney, Agent, or Firm* — Lippes Mathias LLP

(57) ABSTRACT

There is provided an apparatus comprising means for for, at a user equipment configured to transmit precoded signals using receive beamformers as transmit precoders over at least one of a plurality of transmission occasions and multiple antenna subsets, receiving configuration parameters, from a network node, for at least one of the precoded signals and the transmit precoders, determining power scaling values based on the configuration parameters, performing power scaling of the transmit precoders using the determined power scaling values, providing an indication to the network node of the determined power scaling values and performing transmission of precoded signals using the transmit precoders scaled by the determined power scaling values.

11 Claims, 9 Drawing Sheets

(58) Field of Classification Search

CPC .. H04B 7/0617; H04B 7/0456; H04B 7/0691; H04B 7/0465; H04B 7/043; H04L 25/0224

See application file for complete search history.

(56) References Cited

U.S. PATENT DOCUMENTS

| | | | | |
|---|---|---|---|---|
| 2019/0327691 | A1* | 10/2019 | Zhang | H04W 52/226 |
| 2021/0105724 | A1* | 4/2021 | Huang | H04W 52/365 |
| 2021/0273689 | A1* | 9/2021 | Shattil | H04B 7/0456 |
| 2021/0352596 | A1* | 11/2021 | Liu | H04W 52/146 |
| 2022/0167199 | A1* | 5/2022 | Liu | H04W 24/02 |
| 2023/0275789 | A1* | 8/2023 | Li | G06N 3/08 375/262 |
| 2025/0266866 | A1* | 8/2025 | Jacobsson | H04B 7/0628 |
| 2025/0287316 | A1* | 9/2025 | Hao | H04W 52/365 |

FOREIGN PATENT DOCUMENTS

| | | | |
|---|---|---|---|
| WO | 2016/131487 | A1 | 8/2016 |
| WO | 2020/154264 | A1 | 7/2020 |
| WO | 2020/205439 | A1 | 10/2020 |
| WO | 2021/067649 | A1 | 4/2021 |

OTHER PUBLICATIONS

Atzeni et al., "Distributed precoding design via over-the-air signaling for cell-free massive Mimo", IEEE Transactions on Wireless Communications, vol. 20, No. 2, Feb. 2021, pp. 1201-1216.

"XR Capacity Evaluation and Enhancements", 3GPP TSG RAN WG1 Meeting #109-e, R1-2203065, Agenda: 9.11.2, Futurewei, May 9-May 20, 2022, 13 pages.

"3rd Generation Partnership Project; Technical Specification Group Radio Access Network; NR; Physical layer procedures for data (Release 17)", 3GPP TS 38.214, V17.3.0, Sep. 2022, pp. 1-232.

"3rd Generation Partnership Project; Technical Specification Group Radio Access Network; NR; Radio Resource Control (RRC) protocol specification (Release 17)", 3GPP TS 38.331, V17.1.0, Jun. 2022, pp. 1-1273.

"3rd Generation Partnership Project; Technical Specification Group Radio Access Network; NR; Physical channels and modulation (Release 17)", 3GPP TS 38.211, V17.3.0, Sep. 2022, pp. 1-136.

"RAN1 Chair's Notes", 3GPP TSG RAN WG1 #109-e, May 9-20, 2022, 209 pages.

Search Report received for corresponding United Kingdom Patent Application No. 2214424.0, dated Mar. 31, 2023, 4 pages.

* cited by examiner 300
304
303
302
301

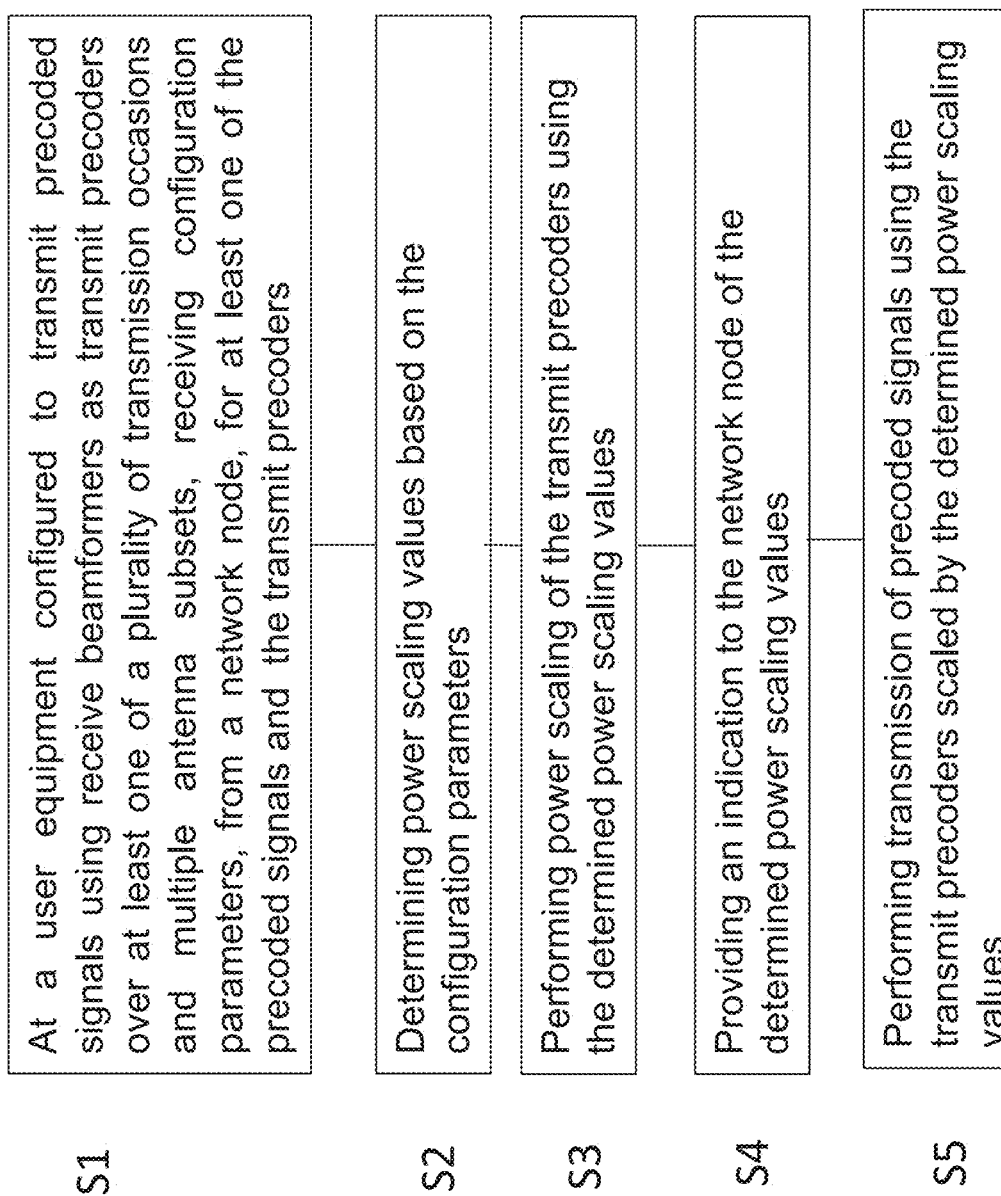

S1  At a user equipment configured to transmit precoded signals using receive beamformers as transmit precoders over at least one of a plurality of transmission occasions and multiple antenna subsets, receiving configuration parameters, from a network node, for at least one of the precoded signals and the transmit precoders S2  Determining power scaling values based on the configuration parameters S3  Performing power scaling of the transmit precoders using the determined power scaling values S4  Providing an indication to the network node of the determined power scaling values S5  Performing transmission of precoded signals using the transmit precoders scaled by the determined power scaling values

Figure 7

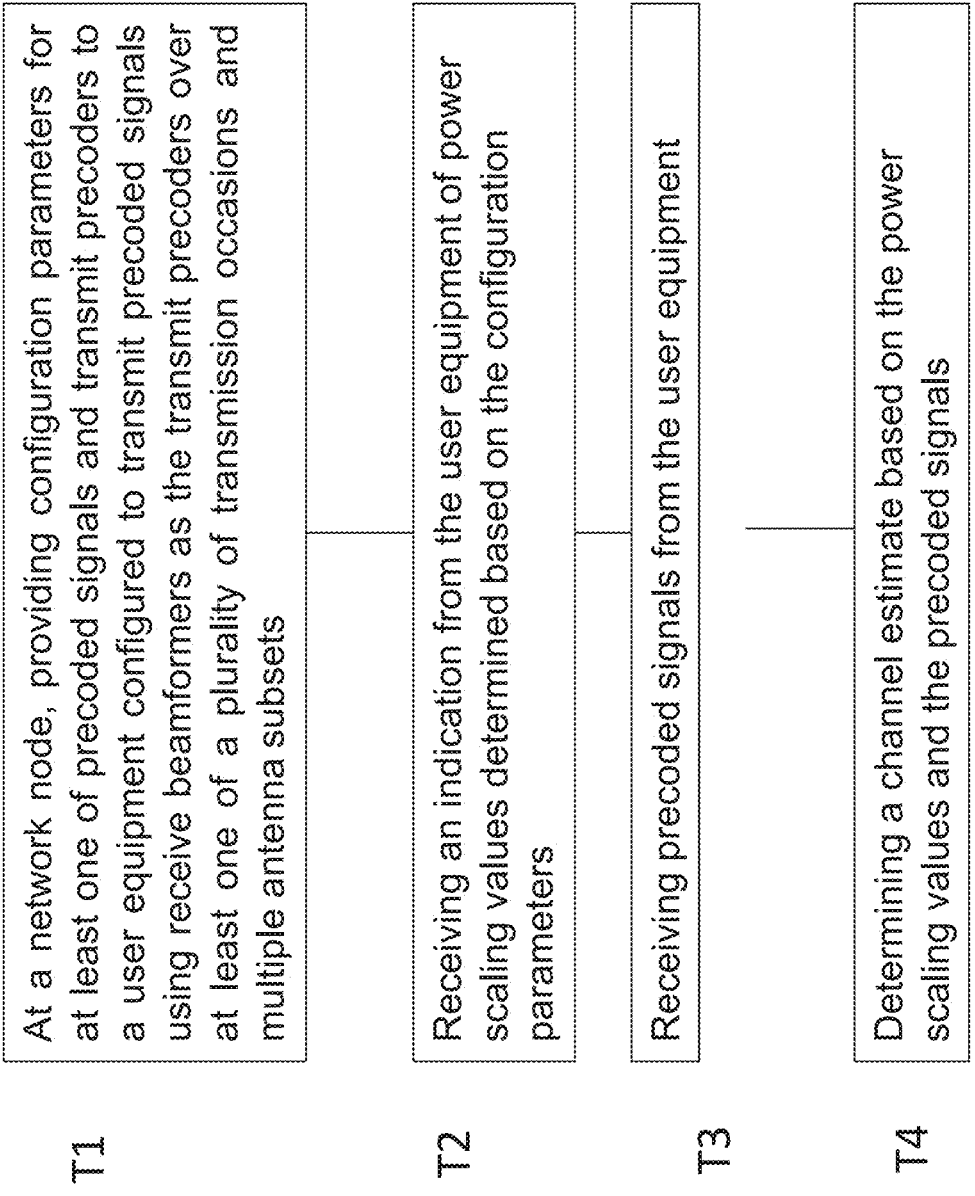

T1  At a network node, providing configuration parameters for at least one of precoded signals and transmit precoders to a user equipment configured to transmit precoded signals using receive beamformers as the transmit precoders over at least one of a plurality of transmission occasions and multiple antenna subsets T2  Receiving an indication from the user equipment of power scaling values determined based on the configuration parameters T3  Receiving precoded signals from the user equipment T4  Determining a channel estimate based on the power scaling values and the precoded signals

Figure 8

APPARATUS, METHOD AND COMPUTER PROGRAM FOR PRECODING

RELATED APPLICATIONS

This application claims priority to, and the benefit of, Great Britain Application No. GB2214424.0, filed on Sep. 30, 2022, the contents of which is hereby incorporated by reference in its entirety.

FIELD

The present application relates to a method, apparatus, system and computer program and in particular but not exclusively to a method for precoded uplink (UL) sounding reference signal (SRS) transmission with asymmetric antenna port configurations.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). Some wireless systems can be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

In a first aspect there is provided an apparatus comprising means for, at a user equipment configured to transmit precoded signals using receive beamformers as transmit precoders over at least one of a plurality of transmission occasions and multiple antenna subsets, receiving configuration parameters, from a network node, for at least one of precoded signals and the transmit precoders, determining power scaling values based on the configuration parameters, performing power scaling of the transmit precoders using the determined power scaling values, providing an indication to the network node of the determined power scaling values and performing transmission of precoded signals using the transmit precoders scaled by the determined power scaling values.

The configuration parameters may comprise an indication of whether to use power scaling for the plurality of transmission occasions.

The configuration parameters may comprise an indication of a scaling method.

The configuration parameters may comprise reporting parameters.

The apparatus may comprise means for reporting, based on the reporting parameters, absolute power scaling values or power scaling values relative to a maximum power scaling value.

The apparatus may comprise means for providing a further indication from the user equipment to the network node that the user equipment is capable of using receive beamformers as transmit precoders for transmitting the precoded signals.

The further indication may comprise an indication that the user equipment is capable of applying the receive beamformers over at least one of multiple transmission occasions and antenna subsets.

The precoded signals may be data signals or reference signals.

The reference signals may comprise at least one of sounding reference signals, demodulation reference signals and non-zero power channel state information reference signals.

In a second aspect there is provided an apparatus comprising means for, at a network node, providing configuration parameters for at least one of precoded signals and transmit precoders to a user equipment configured to transmit precoded signals using receive beamformers as the transmit precoders over at least one of a plurality of transmission occasions and multiple antenna subsets, receiving an indication from the user equipment of power scaling values determined based on the configuration parameters, receiving precoded signals from the user equipment and determining a channel estimate based on the power scaling values and the precoded signals.

The configuration parameters may comprise an indication of whether to use power scaling for the plurality of transmission occasions.

The configuration parameters may comprise an indication of a scaling method.

The configuration parameters may comprise reporting parameters.

The apparatus may comprise means for receiving, based on the reporting parameters, absolute power scaling values or power scaling values relative to a maximum power scaling value.

The apparatus may comprise means for receiving a further indication from the user equipment to the network node that the user equipment is capable of using receive beamformers as transmit precoders for transmitting the precoded signals.

The further indication may comprise an indication that the user equipment is capable of applying the receive beamformers over at least one of multiple transmission occasions and antenna subsets.

The precoded signals may be data signals or reference signals.

The reference signals may comprise at least one of sounding reference signals, demodulation reference signals and non-zero power channel state information reference signals.

In a third aspect there is provided a method comprising, at a user equipment configured to transmit precoded signals using receive beamformers as transmit precoders over at least one of a plurality of transmission occasions and multiple antenna subsets, receiving configuration parameters, from a network node, for at least one of precoded signals and the transmit precoders, determining power scaling values based on the configuration parameters, performing power scaling of the transmit precoders using the determined power scaling values, providing an indication to the network node of the determined power scaling values and performing transmission of precoded signals using the transmit precoders scaled by the determined power scaling values.

The configuration parameters may comprise an indication of whether to use power scaling for the plurality of transmission occasions.

The configuration parameters may comprise an indication of a scaling method.

The configuration parameters may comprise reporting parameters.

The method may comprise reporting, based on the reporting parameters, absolute power scaling values or power scaling values relative to a maximum power scaling value.

The method may comprise providing a further indication from the user equipment to the network node that the user equipment is capable of using receive beamformers as transmit precoders for transmitting the precoded signals.

The further indication may comprise an indication that the user equipment is capable of applying the receive beamformers over at least one of multiple transmission occasions and antenna subsets.

The precoded signals may be data signals or reference signals.

The reference signals may comprise at least one of sounding reference signals, demodulation reference signals and non-zero power channel state information reference signals.

In a fourth aspect there is provided a method comprising, at a network node, providing configuration parameters for at least one of precoded signals and transmit precoders to a user equipment configured to transmit precoded signals using receive beamformers as the transmit precoders over at least one of a plurality of transmission occasions and multiple antenna subsets, receiving an indication from the user equipment of power scaling values determined based on the configuration parameters, receiving precoded signals from the user equipment and determining a channel estimate based on the power scaling values and the precoded signals.

The configuration parameters may comprise an indication of whether to use power scaling for the plurality of transmission occasions.

The configuration parameters may comprise an indication of a scaling method.

The configuration parameters may comprise reporting parameters.

The method may comprise receiving, based on the reporting parameters, absolute power scaling values or power scaling values relative to a maximum power scaling value.

The method may comprise receiving a further indication from the user equipment to the network node that the user equipment is capable of using receive beamformers as transmit precoders for transmitting the precoded signals.

The further indication may comprise an indication that the user equipment is capable of applying the receive beamformers over at least one of multiple transmission occasions and antenna subsets.

The precoded signals may be data signals or reference signals.

The reference signals may comprise at least one of sounding reference signals, demodulation reference signals and non-zero power channel state information reference signals.

In a fifth aspect there is provided an apparatus comprising: at least one processor and at least one memory storing instructions that, when executed by the at least one processor, cause the apparatus at least to, at a user equipment configured to transmit precoded signals using receive beamformers as transmit precoders over at least one of a plurality of transmission occasions and multiple antenna subsets, receive configuration parameters, from a network node, for at least one of the precoded signals and the transmit precoders, determine power scaling values based on the configuration parameters, perform power scaling of the transmit precoders using the determined power scaling values, provide an indication to the network node of the determined power scaling values and perform transmission of precoded signals using the transmit precoders scaled by the determined power scaling values.

The configuration parameters may comprise an indication of whether to use power scaling for the plurality of transmission occasions.

The configuration parameters may comprise an indication of a scaling method.

The configuration parameters may comprise reporting parameters.

The apparatus may be caused to report absolute power scaling values or power scaling values relative to a maximum power scaling value.

The apparatus may be caused to provide a further indication from the user equipment to the network node that the user equipment is capable of using receive beamformers as transmit precoders for transmitting the precoded signals.

The further indication may comprise an indication that the user equipment is capable of applying the receive beamformers over at least one of multiple transmission occasions and antenna subsets.

The precoded signals may be data signals or reference signals.

The reference signals may comprise at least one of sounding reference signals, demodulation reference signals and non-zero power channel state information reference signals.

In a sixth aspect there is provided an apparatus comprising: at least one processor and at least one memory storing instructions that, when executed by the at least one processor, cause the apparatus at least to at a network node, provide configuration parameters for at least one of precoded signals and transmit precoders to a user equipment configured to transmit precoded signals using receive beamformers as the transmit precoders over at least one of a plurality of transmission occasions and multiple antenna subsets, receive an indication from the user equipment of power scaling values determined based on the configuration parameters, receive precoded signals from the user equipment and determine a channel estimate based on the power scaling values and the precoded signals.

The configuration parameters may comprise an indication of whether to use power scaling for the plurality of transmission occasions.

The configuration parameters may comprise an indication of a scaling method.

The configuration parameters may comprise reporting parameters.

The apparatus may be caused to receive, based on the reporting parameters, absolute power scaling values or power scaling values relative to a maximum power scaling value.

The apparatus may be caused to receive a further indication from the user equipment to the network node that the user equipment is capable of using receive beamformers as transmit precoders for transmitting the precoded signals.

The further indication may comprise an indication that the user equipment is capable of applying the receive beamformers over at least one of multiple transmission occasions and antenna subsets.

The precoded signals may be data signals or reference signals.

The reference signals may comprise at least one of sounding reference signals, demodulation reference signals and non-zero power channel state information reference signals.

In a seventh aspect there is provided a computer readable medium comprising instructions which, when executed by an apparatus, cause the apparatus to perform at least the following, at a user equipment configured to transmit precoded signals using receive beamformers as transmit precoders over at least one of a plurality of transmission occasions and multiple antenna subsets, receiving configuration parameters, from a network node, for at least one of the precoded signals and the transmit precoders, determining power scaling values based on the configuration parameters, performing power scaling of the transmit precoders using the determined power scaling values, providing an indication to the network node of the determined power scaling values and performing transmission of precoded signals using the transmit precoders scaled by the determined power scaling values.

The configuration parameters may comprise an indication of whether to use power scaling for the plurality of transmission occasions.

The configuration parameters may comprise an indication of a scaling method.

The configuration parameters may comprise reporting parameters.

The apparatus may be caused to perform reporting, based on the reporting parameters, absolute power scaling values or power scaling values relative to a maximum power scaling value.

The apparatus may be caused to perform providing a further indication from the user equipment to the network node that the user equipment is capable of using receive beamformers as transmit precoders for transmitting the precoded signals.

The further indication may comprise an indication that the user equipment is capable of applying the receive beamformers over at least one of multiple transmission occasions and antenna subsets.

The precoded signals may be data signals or reference signals.

The reference signals may comprise at least one of sounding reference signals, demodulation reference signals and non-zero power channel state information reference signals.

In an eighth aspect there is provided a computer readable medium comprising instructions which, when executed by an apparatus, cause the apparatus to perform at least the following at a network node, providing configuration parameters for at least one of precoded signals and transmit precoders to a user equipment configured to transmit precoded signals using receive beamformers as the transmit precoders over at least one of a plurality of transmission occasions and multiple antenna subsets, receiving an indication from the user equipment of power scaling values determined based on the configuration parameters, receiving precoded signals from the user equipment and determining a channel estimate based on the power scaling values and the precoded signals.

The configuration parameters may comprise an indication of whether to use power scaling for the plurality of transmission occasions.

The configuration parameters may comprise an indication of a scaling method.

The configuration parameters may comprise reporting parameters.

The apparatus may be caused to perform receiving, based on the reporting parameters, absolute power scaling values or power scaling values relative to a maximum power scaling value.

The apparatus may be caused to perform receiving a further indication from the user equipment to the network node that the user equipment is capable of using receive beamformers as transmit precoders for transmitting the precoded signals.

The further indication may comprise an indication that the user equipment is capable of applying the receive beamformers over at least one of multiple transmission occasions and antenna subsets.

The precoded signals may be data signals or reference signals.

The reference signals may comprise at least one of sounding reference signals, demodulation reference signals and non-zero power channel state information reference signals. In a ninth aspect there is provided a non-transitory computer readable medium comprising program instructions for causing an apparatus to perform at least the method according to the third or fourth aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 7 shows a flowchart of a method according to an example embodiment;

FIG. 8 shows a flowchart of a method according to an example embodiment;

DETAILED DESCRIPTION

Before explaining in detail the examples, certain general principles of a wireless communication system and mobile communication devices are briefly explained with reference to FIGS. 1 to 3 to assist in understanding the technology underlying the described examples.

An example of a suitable communications system is the 5G or NR concept. Network architecture in NR may be similar to that of LTE-advanced. Base stations of NR systems may be known as next generation Node Bs (gNBs). Changes to the network architecture may depend on the need to support various radio technologies and finer QoS support, and some on-demand requirements for e.g. Quality of Service (QoS) levels to support Quality of Experience (QoE) for a user. Also network aware services and applications, and service and application aware networks may bring changes to the architecture. Those are related to Information Centric Network (ICN) and User-Centric Content Delivery Network (UC-CDN) approaches. NR may use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Figure 1:
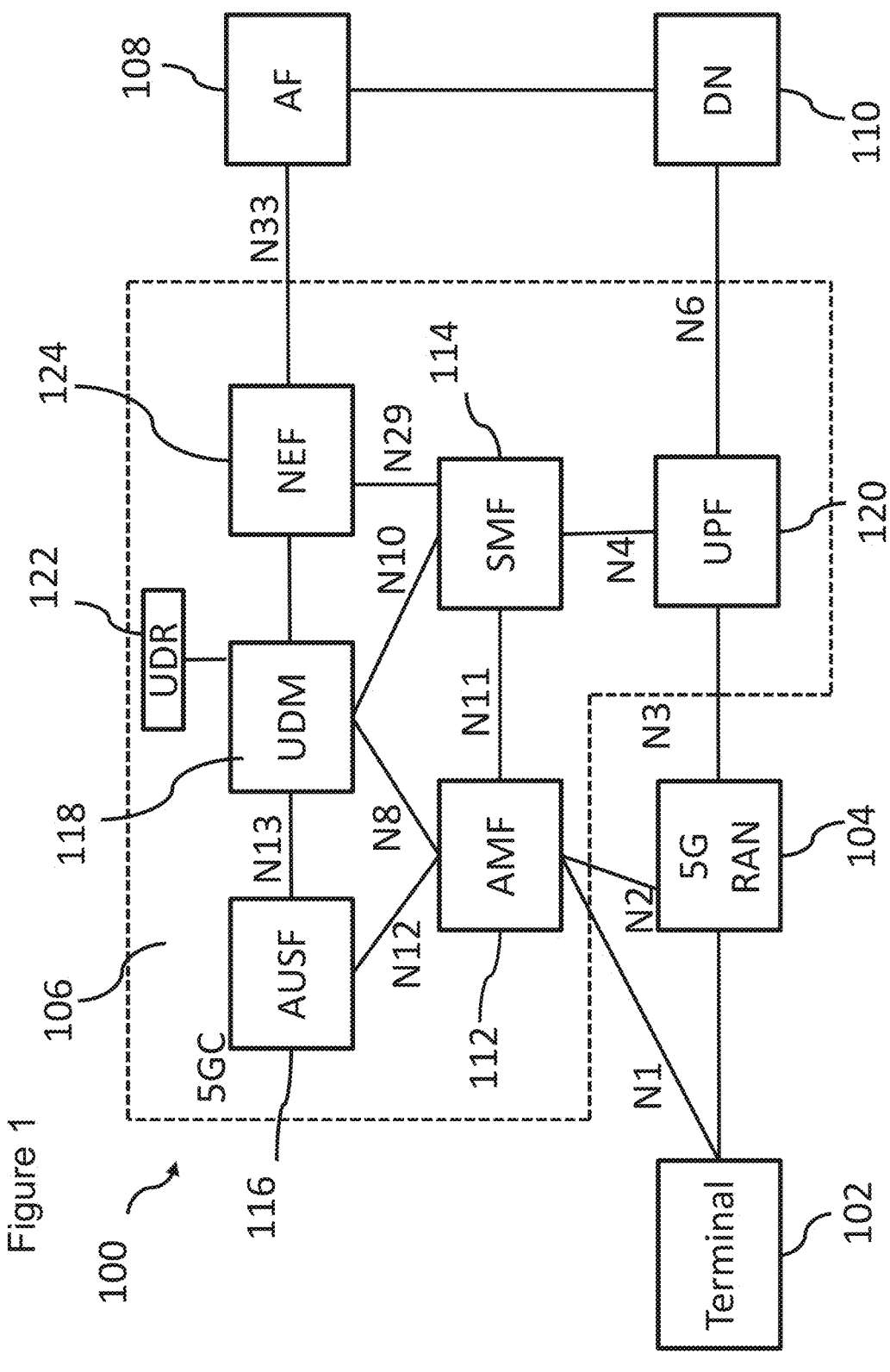
FIG. 1 shows a schematic diagram of an example 5GS communication system.

FIG. 1 shows a schematic representation of a 5G system (5GS) 100. The 5GS may comprise a user equipment (UE) 102 (which may also be referred to as a communication device or a terminal), a 5G radio access network (5GRAN) 104, a 5G core network (5GCN) 106, one or more application functions (AF) 108 and one or more data networks (DN) 110.

An example 5G core network (CN) comprises functional entities. The 5GCN 106 may comprise one or more access and mobility management functions (AMF) 112, one or more session management functions (SMF) 114, an authentication server function (AUSF) 116, a unified data management (UDM) 118, one or more user plane functions (UPF) 120, a unified data repository (UDR) 122 and/or a network exposure function (NEF) 124. The UPF is controlled by the SMF (Session Management Function) that receives policies from a PCF (Policy Control Function).

The CN is connected to a UE via the radio access network (RAN). The 5GRAN may comprise one or more gNodeB (GNB) distributed unit functions connected to one or more gNodeB (GNB) centralized unit functions. The RAN may comprise one or more access nodes.

A User Plane Function (UPF) referred to as PDU Session Anchor (PSA) may be responsible for forwarding frames back and forth between the DN and the tunnels established over the 5G towards the UE(s) exchanging traffic with the DN.

Figure 2:
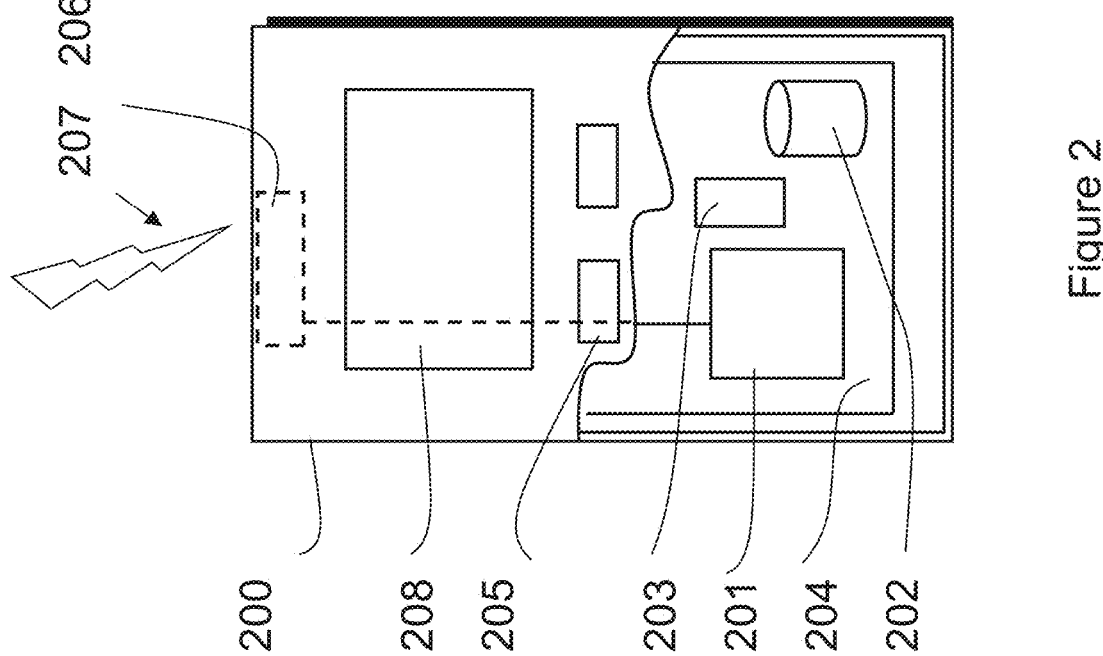
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, voice over IP (VoIP) phones, portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), smart devices, wireless customer-premises equipment (CPE), or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
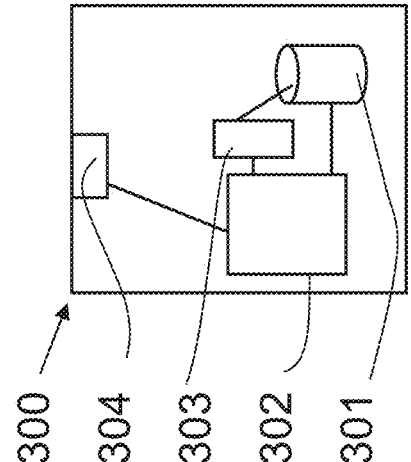
FIG. 3 shows a schematic diagram of an example control apparatus.

FIG. 3 shows an example of a control apparatus 300 for a communication system, for example to be coupled to and/or for controlling a station of an access system, such as a RAN node, e.g. a base station, eNB or gNB, a relay node or a core network node such as an MME or S-GW or P-GW, or a core network function such as AMF/SMF, or a server or host. The method may be implemented in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

The following relates to non-codebook-based precoding design at the UE, for example for bi-directional beamforming training. For a TDD system, bi-directional beamforming training (BiT) allows UEs and transmission/reception points (TRP) to iteratively train the transmit/receive beamformers (also referred to as precoders and/or combiners) using over-the-air signaling. In bi-directional beamforming training, UEs' and TRPs' precoders/combiners are trained based on the effective channels. This implies the precoders/combiners at the UEs and TRPs are considered as non-codebook-based design. The bidirectional iterative training method may improve the network spectral efficiency.

Network efficiency may be improved due to the following. Beamformers can account for interference with direct estimation without knowing the specific source of interference. The beamformers can be adapted to the changes in the interference/channels with continuous updates. The training is effective in coordinated/cooperative (coherent and non-coherent) networks. The training overhead is reduced since stream-specific estimates require fewer resources than antenna port-specific estimates. The accuracy of the CSI estimation improves over the iterations with the beamforming gain.

Bi-directional beamforming training requires an equal number of DL and UL layers (i.e., effective channels via precoded pilot resources) to train the TX and RX beamformers. It may be assumed that the pilot resources are transmitted during training via a one-to-one mapping of DL and UL layers, where the receivers of the DL slot are used as precoders in the subsequent UL slot.

There is considered to be a one-to-one mapping between the DL and UL training resources, where the receiver derived during the DL slot is used as a precoder for the UL RS transmission. However, this mapping might not be possible. In other words, in practice, symmetry between DL and UL may not be possible. The association between UL and DL training resources may be asymmetric.

There may be a difference in gNB and UE processing capability. The UE may be limited to transmitting a smaller number of layers in UL than it can receive in DL. However, for successful DL transmission, the high-rank channel should still be sounded, possibly via SRS transmissions in multiple slots.

There may be a difference in gNB and UE hardware capability. The UE might be limited to using less antennas in transmission than reception and is required to apply antenna switching to transmit SRS and sound the complete DL channel.

The UE may have power limitations. A cell-edge UE (or a UE in power saving) can be limited by the available transmit power, i.e., the transmission of multiple layers in UL results in highly erroneous transmission on some of the layers. However, it is still possible for the UE to receive multiple layers in DL, i.e., the DL precoders at the gNB still need to be trained. Furthermore, by transmitting the same data layer multiple times in UL with different UL precoders the transmission signal quality may be boosted due to antenna diversity.

A gNB can decide to use multiple UL slots instead of one to transmit RS.

Thus, a practical bi-directional training-based UE precoding design should support the asymmetric association between the DL resources and UL resources. It would be useful to define how the receivers derived in a DL slot are mapped to UL precoders to enable BiT in a system where the number of DL and UL layers (and thus the number of DL and UL slots for channel sounding and/or data transmission), or the number of active antennas, can be different.

According to Rel-17, for non-codebook-based transmission, the UE can calculate the precoder to be used for the transmission of the SRS based on measurement of an associated NZP CSI-RS resource. A UE can be configured with only one NZP CSI-RS resource for the SRS resource set with higher layer parameter usage in SRS-ResourceSet set to 'nonCodebook' if configured. However, current New Radio specifications provide support for this feature only for non-codebook-based PUSCH transmission.

The bi-directional beamforming training method is being considered for XR communications under 5G NR.

Bi-directional beamforming training (BiT) may be an efficient technique for improving the capacity in coordinated and/or cooperative networks. Via over-the-air training, BiT design can account for unknown interference and adapt to channel changes over time with continuous precoder/combiner tracking at the UEs and TRPs. However, the implementation of BiT requires multiple DL and UL training resources and the association between them. Furthermore, as the training relies on estimating the effective UL/DL channels (i.e., the combined effects of precoder and channel), any relative differences in the $l_2$-norms of the precoders must be retained, i.e., the precoders should not be normalized to unit power (an example case is illustrated in FIG. 4, which shows the effect of incorrect scaling).

Figure 4:
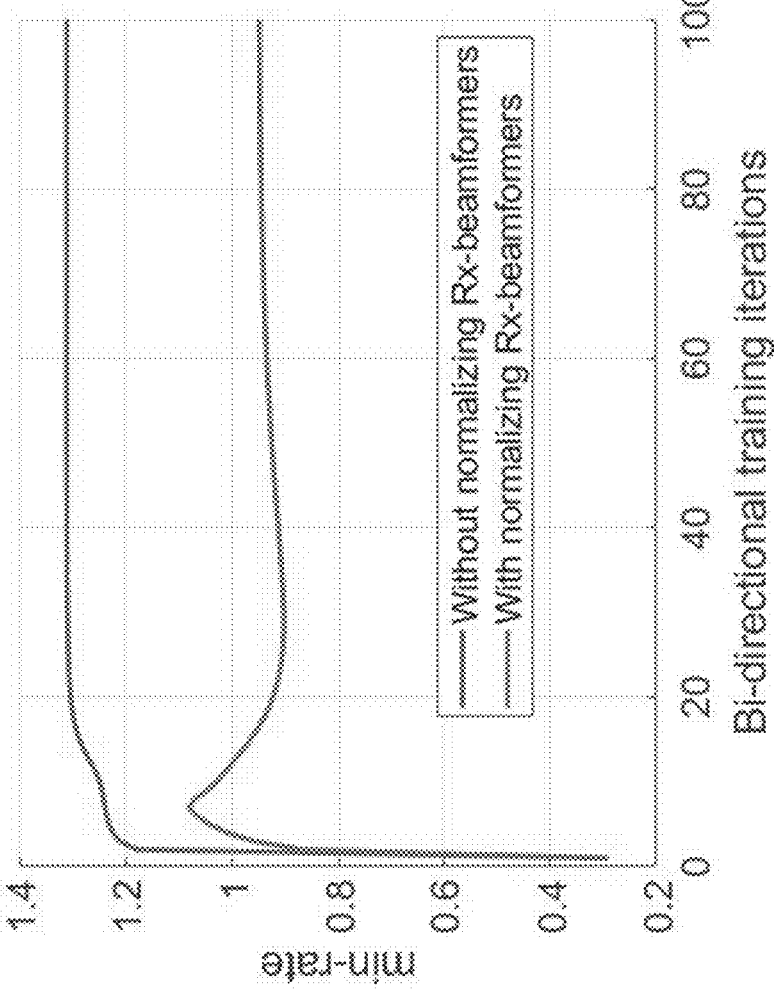
FIG. 4 shows a graph of min-rate against bi-direcitonal training iterations with and without normalising Rx-beamformers.

In the simulation illustrated in FIG. 4, a single BS with 8 antennas and a single UE with 4 antennas, served with 4 streams is considered. For the evaluation of min-rate, the sum MSE metric and a simple correlated channel model is used. From FIG. 4, it can be seen that the min-rate is not monotonic over the iterations if the scaling is not preserved at the receive beamformers while transmitting in the uplink. In this example, the min-rate obtained by preserving the scaling at the receive beamformers is better than the one resulting from normalized beamformers.

Figure 5:
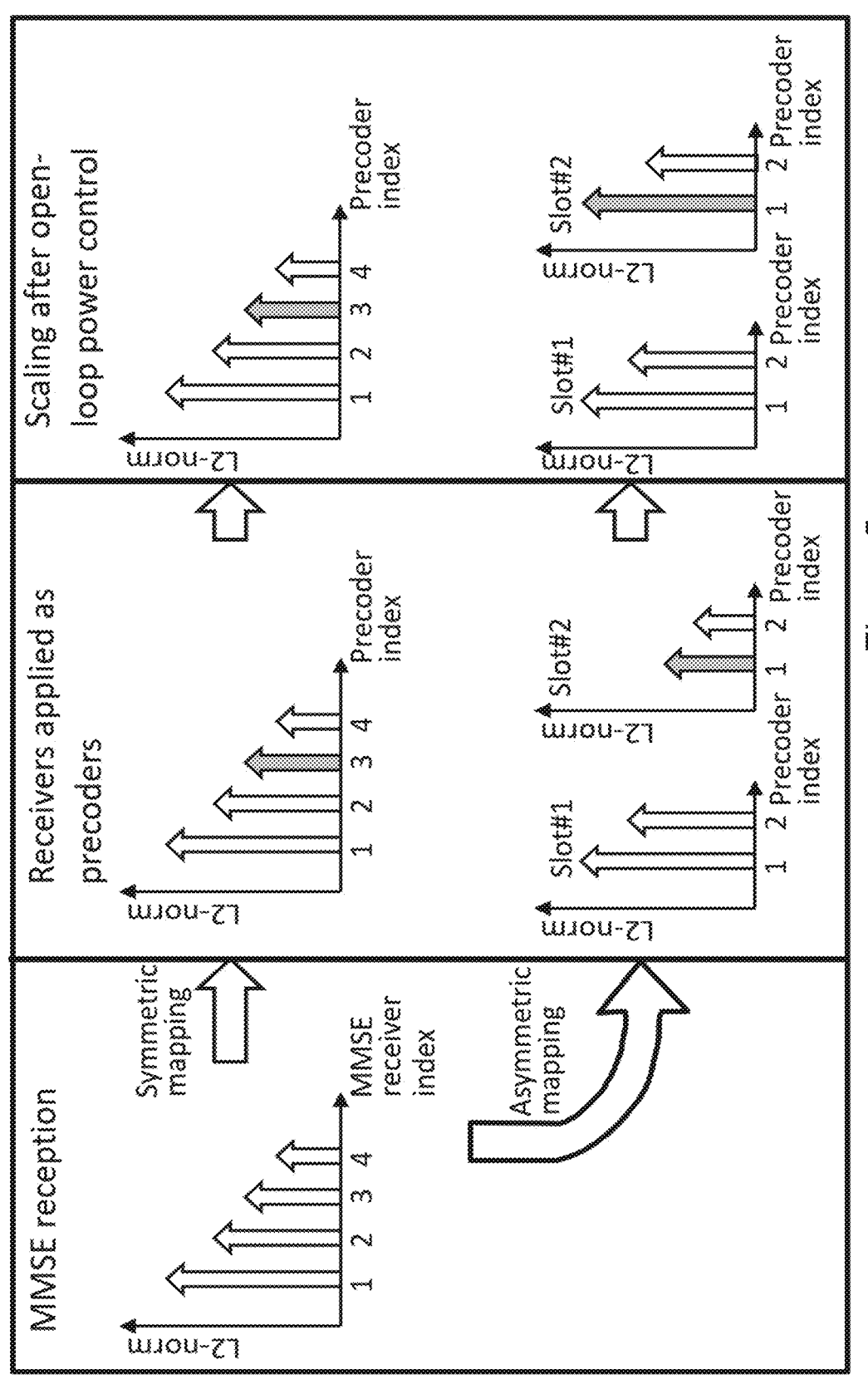
FIG. 5 shows Bi-directional training operation (symmetric VS asymmetric mapping) for the case of 4 simultaneous DL layers and 4 VS 2 simultaneous UL layers.

Open-loop power control at the UE will adjust the transmit power in an attempt to reach the nominal target signal level at the gNB. In the symmetric transmission case (equal number of layers in UL and DL), along with sufficient hardware capability at the UE (i.e., no antenna switching required), this is not an issue since the relative differences in the $I_2$-norms of the receivers (which are used as precoders) will be retained. However, when the UL sounding (or data transmission) is divided into multiple slots, some slots will be precoded with receivers that have lower I2-norms than other slots, which will then be scaled up by the open loop power control. This removes the relative scaling between beamformers with detrimental impact on the effective channel estimate, which now has incorrect scaling in some columns of the channel matrix. This effect is illustrated in FIG. 5 which shows bi-directional training operation (symmetric VS asymmetric mapping) for the case of 4 simultaneous DL layers and 4 VS 2 simultaneous UL layers. From the asymmetric case, it is evident that the relative power scaling of the precoders is lost during the open-loop power control.

If the UE hardware capability is asymmetric in the DL and UL, i.e., the number of antennas that can be used for reception is higher than for transmission, antenna switching needs to be applied. By default, this transmission scheme results in the transmission being divided into multiple slots, and a similar loss of precoder scaling as detailed above, but additionally the precoders only apply to a subset of UE antennas. Thus, the relative precoder scaling can also be lost among the antennas, as each subset of antennas undergoes independent open-loop power control in separate time slots. This further reduces the accuracy of the channel estimate, which is easily shown by writing out a representation of the received signal as follows:

$$Y=Hw\alpha p^T+N,$$

where H is the channel matrix, w is the full transmit precoder, a is a power control parameter that scales the transmit signal to full power, p is a vector representing the pilot sequence, and N is the matrix of additive noise. Now, to apply antenna switching, we can write this in sum-form where the different sum-terms correspond to what would ideally be transmitted in different slots:

$$Y=Hw\alpha p^T+N=H^{(1)}w^{(1)}\alpha p^T+H^{(2)}w^{(2)}\alpha p^T+N,$$

where $w^{(1)}$ is a subset of vector w, and $H^{(1)}$ contains the corresponding columns. From above, it can be seen that ideally the power control scaling parameter is the same in both of the sum terms. However, as the $I_2$-norms of $w^{(1)}$ and $w^{(2)}$ are not necessarily the same, in actuality the open-loop power control adjusts the power scaling term $\alpha$ independently in each slot to meet the power constraint:

$$Y_1=H^{(1)}w^{(1)}\alpha_1 p^T+N_1$$

$$Y_2=H^{(2)}w^{(2)}\alpha_2 p^T+N_2,$$

and now, if these terms are summed as before, the scaling of the sum-terms is incorrect, unless the terms are downscaled separately with $$Y\approx\frac{1}{\alpha_1}Y_1+\frac{1}{\alpha_2}Y_2,$$

which requires knowledge of the individual scaling parameters at the gNB.

Current specifications provide only support for a single UL and DL transmission pair triggering via DCI with or without data grant. This process may be triggered iteratively with a periodic/aperiodic DL NZP-CSI-RS sequence and TRPs receive the precoded UL SRS correspondingly. The implementation of BiT with DL NZP-CSI-RS and UL SRS resources may increase the network overhead and latency.

BiT may be implemented with extra SRS resources called as 'SRS (interference probing)'. To utilize TDD UL-DL reciprocity for interference measurement, some sounding activities are tied to the scheduled DL transmissions, which may be referred to as DL Interference Probing or SRS Probing. Then, by utilizing TDD-based channel reciprocity, a gNB seeing strong UL interference from a certain spatial direction on the SRS resources (for example, via estimating the UL spatial covariance of interference signal) implies that in DL transmission the gNB will cause strong interference to UE(s) in that direction. The gNB can then adjust the precoding for DL interference avoidance. The gNBs in the network can coordinate the probing SRS resources in a semi-static fashion a priori, but essentially no inter-gNB information exchange is required on the fly. DL Interference Probing from UL is possible if the network controls the UEs to transmit SRS in a way that best reflects prospective DL interference.

Figure 6:
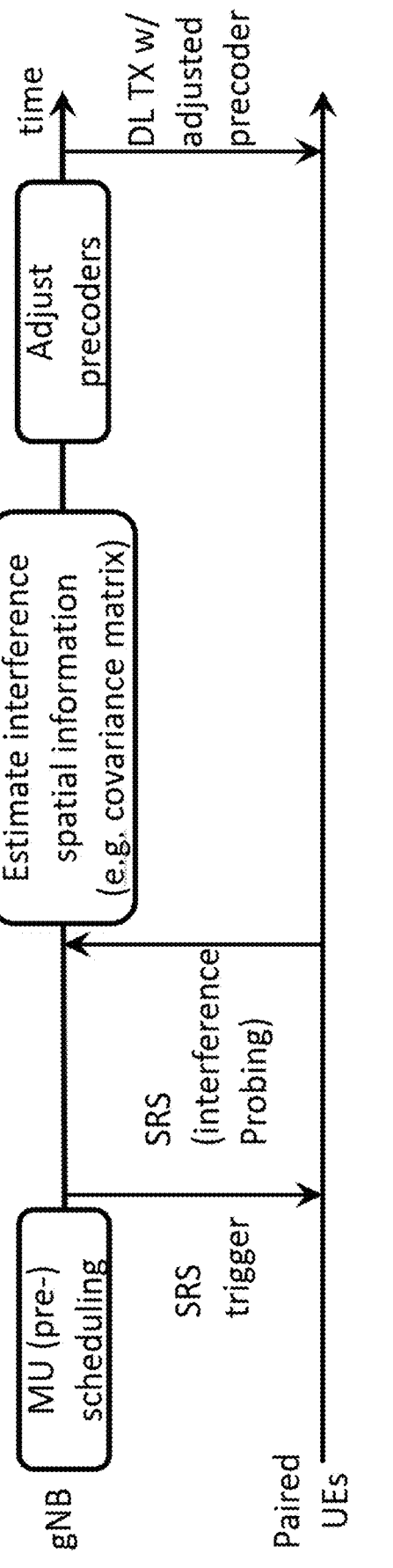
FIG. 6 shows a schematic diagram of TDD DL SE performance enhancement via interference probing and mitigation.

The above approach is illustrated in FIG. 6, where the sounding from UEs is based on prescheduling and reflects UE receive beamforming capabilities. As a result, the gNB can acquire DL interference spatial information. The gNB adjusts the precoders and thus DL SINR and SE can be improved. Furthermore, depending on the network implementation, more UEs/layers may be paired for MU-MIMO (such as via less conservative scheduling), yielding even higher spectral efficiency gains. This approach of interference probing and mitigation, namely SRS probing, may be used to enable a variety of communication schemes to be implemented, generally in the category of Cooperative Massive MIMO.

The approach illustrated in FIG. 6 may be effective to suppress both inter-cell and intra-cell interference. It is distributed across gNBs (or TRPs) in the network, with low computational complexity for each gNB. No or little channel information exchange is needed among the gNBs. It can adapt to inter-cell interference, including unknown interference from non-cooperative gNBs or outside of the network (e.g., from other service providers, small cells, etc.). There is no need to estimate the element-wise channel, reducing the complexity and overhead.

One way to implement the above approach is iterative BiT. Alternatively, BiT without multiple iterations (i.e., consisting of one-shot interference probing before the PDSCH transmission, as shown in FIG. 6 above) can be performed, in which the beamformed sounding based on conventional DL channel measurement and interference measurement is used. The latter may be more practical for some wireless communications.

One proposal utilises the effective channel obtained from downlink pilot signaling to derive the uplink precoders and vice versa. A one-to-one (symmetric) mapping of different RS signals is defined that may be used in the process.

FIG. 7 shows a flowchart of a method according to an example embodiment. The method is performed at a user equipment configured to transmit precoded signals using receive beamformers as transmit precoders over at least one of a plurality of transmission occasions and multiple antenna subsets.

In S1, the method comprises receiving configuration parameters, from a network node, for at least one of the precoded signals and the transmit precoders.

In S2, the method comprises determining power scaling values based on the configuration parameters.

In S3, the method comprises performing power scaling of the transmit precoders using the determined power scaling values. The power scaling may be of the precoded signal resources.

In S4, the method comprises providing an indication to the network node of the determined power scaling values.

In S5, the method comprises performing transmission of precoded signals based using the transmit precoders scaled by the determined power scaling values.

FIG. 8 shows a flowchart of a method according to an example embodiment. The method may be performed at a network node.

In T1, the method comprises providing configuration parameters for at least one of precoded signals and transmit precoders to a user equipment configured to transmit precoded signals using receive beamformers as the transmit precoders over at least one of a plurality of transmission occasions and multiple antenna subsets.

In T2, the method comprises receiving an indication from the user equipment of power scaling values determined based on the configuration parameters.

In T3, the method comprises receiving precoded signals from the user equipment.

In T4, the method comprises determining a channel estimate based on the power scaling values and the precoded signals.

The precoded signals may be data signals or reference signals.

The method may provide a UE procedure, signalling and UL RS associations to enable DL/UL channel sounding for the asymmetric DL/UL scenario, where in one option the UE transmits precoded UL SRS via asymmetric UE RX and TX antenna ports.

The method may allow an asymmetrical undertaking of the channel sounding (or data transmission) and avoid the loss of relative scaling information of the precoders due to independent open-loop power control.

The method may comprise providing a further indication from the user equipment to the network node that the user equipment is capable of using receive beamformers as transmit precoders. The further indication may comprise an indication that the user equipment is capable of applying the receive beamformers over at least one of multiple transmission occasions and antenna subsets.

In an example embodiment, the UE informs the gNB whether it is capable of using the receive beamformers as transmit precoders and whether it needs to, and is able to, apply the receive beamformers over multiple time slots and active antenna subsets. This indication may be known as capability signaling. The UE may transmit multiple layers.

The UE indicates via capability signalling that it has the capability to use the receive beamformer(s) as transmit SRS precoder(s), and is able to determine the split between the receive beamformers over multiple transmission occasions and antenna port subsets.

The configuration parameters may comprise an indication of whether to use scaling for the plurality of transmission occasions. The configuration parameters may comprise reporting parameters.

In an example embodiment, the UE is configured by the gNB on whether to utilize a scaling procedure to mitigate the effect of the open-loop power control, and how to report the scaling values.

The gNB configures the UE to report "power scaling values" associated with SRS precoders. The gNB determines whether to report the absolute power scaling values or their relative power differences with respect the maximum power scaling value (defining also reporting order, e.g. maximum value first, second largest power difference as second, etc.). The gNB determines the reporting format and granularity.

The reporting parameters may comprise an indication of whether to use absolute power scaling values or power scaling values relative to a maximum power scaling value, an indication of reporting format and/or scaling parameter granularity. The gNB configures whether to report the absolute scaling parameter values, or a relative difference between them, along with the reporting format and scaling parameter granularity.

The gNB determines the scaling method, or whether to use separate scaling between transmission occasions at all.

The configuration parameters may comprise an indication of a scaling method.

To mitigate the effect of open-loop power control that removes the relative scaling between the DL receivers applied as UL precoders, multiple procedures of designing the uplink transmission (or scaling methods) are proposed. Note, that all the procedures described require that the gNB knows how the DL receivers are divided/decomposed and allocated between UL slots to successfully reconstruct the effective channel matrix. This can be done via extra signaling, e.g., through the use of codebooks. It should also be noted, that while the description below considers channel sounding, the principle described herein may be applied also for asymmetric data transmission. An example of this would be a cell-edge UE transmitting the same PUSCH data multiple times, in different slots with different precoders, to obtain diversity gains for an otherwise weak signal.

In an example embodiment there may be asymmetry in processing capability (with no antenna switching). To avoid the loss of the relative powers between the precoders (and thus the erroneous scaling of the effective channel matrix), the first option for scaling is to use open-loop power control only once. The UL transmit power is controlled based on the slot with maximum allocated precoder power, i.e., where the sum of the $l_2$-norms of the precoders is the highest. On the other UL slots that utilize the precoders derived from the DL slot, the same UL transmit power scaling is then used, i.e., all the UL precoders in different slots experience similar power amplification, retaining the relative scaling between the precoders. This method requires the ability to use the same amplification obtained via open-loop power control in multiple slots.

Alternatively, there may be slot-specific precoder scaling. To bypass the effect of the open-loop power control, and the consequent change in precoder scaling, a scaling parameter in each UL slot that is used to upscale all the UL precoders is introduced. The upscaling is done in such a way that the Frobenius-norm of the concatenated UL precoders of one slot is the same as all the other slots, i.e., $$\alpha_i \|[w_{i1} w_{i2} \ \ldots \ w_{iN}]\|_F = \alpha_j \|[w_{j(N+1)} w_{j(N+2)} \ \ldots \ w_{j(2N)}]\|_F, i \neq j,$$

where $\alpha_i$ is the scaling parameter and $w_{in}$ is the precoder of uplink slot i that accesses the layer n. Here, N denotes the number of layers that can be allocated for each time slot, ranging from the full number of DL layers (i.e., the symmetric case) to one (i.e., all the layers are sounded in separate time slots). This method scales all the UL slots to the same transmit power and retains the relative norm-differences in the precoders through the use of scaling parameters. The scaling parameters (or relative differences between the scaling parameters) are quantized and signaled to the gNB enabling the downscaling of the appropriate columns in the estimated effective channel, thus retaining the correct relative scaling.

Alternatively, codebook-based precoder scrambling may be used as a scaling method. To reduce the feedback overhead caused by the scaling parameters, the UE can use codebook-based combinations of the DL receivers as UL precoders with a fixed scaling parameter across all the UL slots. For example, in the case with 4 DL layers to 2 UL layers, we have $$W_{slot1} = \alpha_{slot1}[(w_1+w_2)p_1+(w_3+w_4)p_2],$$

$$W_{slot2} = \alpha_{slot2}[(w_1-w_2)p_1+(w_3-w_4)p_2],$$

where $W_{sloti}$ is a representation of the transmit signal in slot i and $p_n$ is the pilot signal sequence associated with layer n. Now, if we assume $\alpha_{slot1}$ is close to equal to $\alpha_{slot2}$, the beamformers can be recovered by combining $W_{slot1} + W_{slot2}$ and $W_{slot1} - W_{slot2}$. The combinations should be codebook-based, as the gNB requires knowledge of how the receivers are combined to procure the UL precoders. Thus, the gNB can recover the correct effective channel matrix columns. The codebook depends on the amount of asymmetry, i.e., what is the relative difference in the number of DL layers to UL layers. The UE can find the combinations that result in similar Frobenius-norms (i.e., the scaling parameters are close to equal by design and need not be signaled), which can be recovered at the gNB by combining the received signals from multiple UL slots. Along with the UL transmission, the UE needs to report to the gNB the codebook entry that is used in the precoder scrambling. Then, if appropriate combinations are used, and the scaling factors are similar, the effective channel with appropriate column scaling can be recovered.

In another example embodiment, there is asymmetry in hardware capability (antenna switching) and single-layer transmission.

Similarly to the case when the asymmetry is in the layer-domain, for the scaling method, the open-loop power control is only applied once among the transmission slots, i.e., each time the antenna switching happens. The receiver is applied as a precoder as if all the antennas are active. Then, at each time slot, only a subset of the elements of the precoder are applied to the active antennas without additional scaling in digital domain.

Alternatively, to bypass the effect of the open-loop power control, and the consequent change in precoder (and effective channel matrix row) scaling, an antenna-subset scaling parameter can be introduced in the scaling methof, which upscales the slot-wise precoders that utilize only a subset of antennas. Similar to the case when the asymmetry is in the layer-domain, the scaling is done so that the $I_2$-norms of the subset precoders are the same, and thus undergo similar open-loop power control. The relative scaling between the subset precoders is retained via the scaling parameters. These scaling parameters are signaled to the gNB, enabling the appropriate downscaling of the components that sum up to form the estimated effective channel matrix.

In practice, there may be asymmetries in both hardware (antenna switching) and processing (difference in number of layers for UL/DL) capabilities. In these cases, a combination of the scaling method embodiments described above may be used.

In the example embodiment, the UE undertakes the scaling procedure using the scaling method and appropriately reports the scaling to the gNB. After defining the method, the UE undertakes the designated scaling, calculates the scaling values, and reports them to the gNB along with other parameters regarding the chosen method (such as the scrambling codebook entry). The reporting format is based on the configured UL SRS layers-to-slot and antenna switching configurations.

The reporting format is based on the configuration parameters, e.g., configured UL SRS layers-to-slot and antenna switching configurations. In a first option, a list of absolute power scaling values for each transmit precoder associated separate transmission occasions (order of power values follows the splitting configuration defined by the network). In a second option, a relative power difference with respect to maximum power scaling values over multiple transmission occasions (order of power values follows the splitting configuration defined by the network, where the maximum is always the first element).

Upon reception of the power scaling report, the gNB has knowledge of how to apply the reported values for DL CSI acquisition, i.e., remove the incorrect scaling from the effective channel estimate. The gNB determines and informs the UE of the resources when it should transmit the multi-slot SRS and apply the power scaling. The gNB may indicates dynamically (via L1-signaling or MAC-level signaling) the UE to transmit the SRS over multiple transmission occasions and apply the power scaling, correspondingly.

The UE transmits the UL SRS resources over multiple transmission occasions to sound the channel and uses the configured scaling procedure. The gNB estimates the effective channel (i.e., channel multiplied by the precoders) and removes the incorrect scaling based on the UE scaling report.

Figure 9:
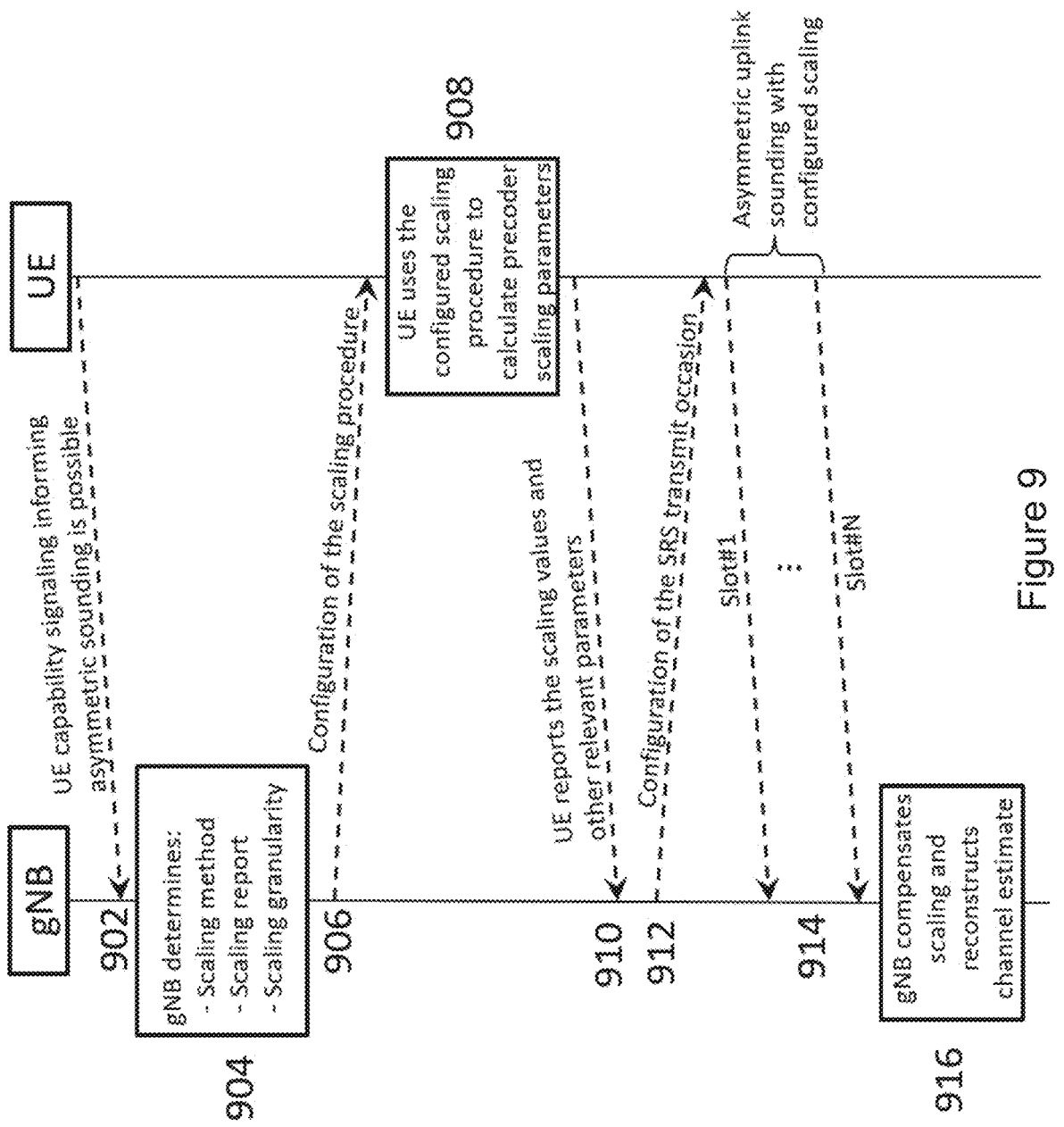
FIG. 9 shows a signalling flow between a UE and a gNB according to an example embodiment.

FIG. 9 illustrates an example asymmetric channel sounding signalling chart between a gNB and a UE.

At 902, the UE provides capability signalling information the gNB that asymmetric sounding is possible.

At 904, the gNB determines a scaling method, scaling report and scaling granularity.

At 906, the gNB provides a configuration of the scaling procedure to the UE.

At 908, the UE uses the configured scaling procedure to calculate precoder scaling parameters.

At 910, the UE reports the scaling values and other relevant parameters to the gNB.

At 912, the gNB provides the configuration of the SRS transmit occasion to the UE.

At 914, the UE performs asymmetric uplink sounding with configured scaling.

At 916, the gNB compensates for the scaling and reconstructs a channel estimate.

The use of receivers derived from the DL RS transmissions as precoders in multiple UL slots in such a way that all the DL receivers are used as precoders for UL transmissions at some point. This requires the association between the DL RS of one slot and UL RS of multiple slots, rather than one-to-one mapping (one DL to one UL slot). The reference signals may be any RS designed to enable channel sounding (for example, NZP CSI-RS, SRS, DMRS).

Although the above focusses on the case where there is more UL than DL layers, the method may be applied in the converse case where there is more DL than UL layers.

An apparatus may comprise means for, at a user equipment configured to transmit precoded signals using receive beamformers as transmit precoders over at least one of a plurality of transmission occasions and multiple antenna subsets, receiving configuration parameters, from a network node, for at least one of the precoded signals and the transmit precoders, determining power scaling values based on the configuration parameters, performing power scaling of the transmit precoders using the determined power scaling values, providing an indication to the network node of the determined power scaling values and performing transmission of precoded signals using the transmit precoders scaled by the determined power scaling values.

Alternatively, an apparatus may comprise means for, at a network node, providing configuration parameters for at least one of precoded signals and transmit precoders to a user equipment configured to transmit precoded signals using receive beamformers as the transmit precoders over at least one of a plurality of transmission occasions and multiple antenna subsets, receiving an indication from the user equipment of power scaling values determined based on the configuration parameters, receiving precoded signals from the user equipment; and determining a channel estimate based on the power scaling values and the precoded signals.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media. The term "non-transitory," as used herein, is a limitation of the medium itself (i.e., tangible, not a signal) as opposed to a limitation on data storage persistency (e.g., RAM vs. ROM).

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus comprising:

at least one processor; and at least one memory comprising computer program code, the at least one memory and computer program code are configured, with the at least one processor, to cause the apparatus at least to:

wherein the apparatus is configured to transmit precoded signals using receive beamformers as transmit precoders over at least one of a plurality of transmission occasions and multiple antenna subsets;

receive configuration parameters, from a network node, for at least one of the precoded signals and the transmit precoders;

determine power scaling values based on the configuration parameters;

perform power scaling of the transmit precoders using the determined power scaling values;

provide an indication to the network node of the determined power scaling values; and perform transmission of precoded signals using the transmit precoders scaled by the determined power scaling values.

2. The apparatus according to claim 1, wherein the configuration parameters comprise an indication of whether to use power scaling for the plurality of transmission occasions.

3. The apparatus according to claim 1, wherein the configuration parameters comprise an indication of a scaling method.

4. The apparatus according to claim 1, wherein the configuration parameters comprise reporting parameters.

5. The apparatus according to claim 4, wherein the at least one memory and computer program code are configured, with the at least one processor, to cause the apparatus at least to:

report, based on the reporting parameters, absolute power scaling values or power scaling values relative to a maximum power scaling value.

6. The apparatus according to claim 1, wherein the at least one memory and computer program code are configured, with the at least one processor, to cause the apparatus at least to:

provide a further indication from the apparatus to the network node that the apparatus is capable of using receive beamformers as transmit precoders for transmitting the precoded signals.

7. The apparatus according to claim 6, wherein the further indication comprises an indication that the user apparatus is capable of applying the receive beamformers over at least one of multiple transmission occasions and antenna subsets.

8. The apparatus according to claim 1 wherein the precoded signals are data signals or reference signals.

9. The apparatus according to claim 8, wherein the reference signals comprise at least one of sounding reference signals, demodulation reference signals and non-zero power channel state information reference signals.

10. A method, for a user equipment configured to transmit precoded signals using receive beamformers as transmit precoders over at least one of a plurality of transmission occasions and multiple antenna subsets, comprising:

receiving configuration parameters, from a network node, for at least one of the precoded signals and the transmit precoders;

determining power scaling values based on the configuration parameters;

performing power scaling of the transmit precoders using the determined power scaling values;

providing an indication to the network node of the determined power scaling values; and performing transmission of precoded signals using the transmit precoders scaled by the determined power scaling values.

11. The method according to claim 10, wherein the configuration parameters comprise an indication of whether to use power scaling for the plurality of transmission occasions.

* * * * *